United States Patent [19]

Inoue et al.

[11] Patent Number: 4,858,145
[45] Date of Patent: Aug. 15, 1989

[54] FORCE MEASURING DEVICE

[75] Inventors: Shinichi Inoue, Kobe; Masami Yamanaka, Miki, both of Japan

[73] Assignee: Yamato Scale Company, Limited, Akashi, Japan

[21] Appl. No.: 20,433

[22] Filed: Mar. 2, 1987

[30] Foreign Application Priority Data

Apr. 21, 1986 [JP] Japan .................................. 61-92600

[51] Int. Cl.$^4$ ......................... G01G 3/14; G01G 21/10
[52] U.S. Cl. ..................................... 364/506; 364/567; 364/571.03; 364/571.07; 177/25.11; 177/210 FP; 177/222
[58] Field of Search ........... 364/506, 567, 571, 571.03, 364/571.07; 73/704; 177/25, 26, 210 FP, 229, DIG. 11, 226

[56] References Cited

U.S. PATENT DOCUMENTS

| | | | |
|---|---|---|---|
| 4,070,900 | 1/1978 | Engels | 177/25 |
| 4,165,652 | 8/1979 | Olsen et al. | 73/704 |
| 4,418,774 | 12/1983 | Whitney et al. | 364/567 |
| 4,490,803 | 12/1984 | Briggs et al. | 364/571 |

Primary Examiner—Parshotam S. Lall
Assistant Examiner—Ellis B. Ramirez
Attorney, Agent, or Firm—Senniger, Powers, Leavitt and Roedel

[57] ABSTRACT

A force measuring device mainly used as a weighing device, comprising first and second horizontal cantilever members disposed parallel with each other in a common vertical plane, a weighing cradle attached to the free end of the first member, and a metal string stretched between the free ends of both members. The string is placed between a pair of magnetic poles so that it vibrates at its inherent frequency functionally relating to its tension and, therefore, a load applied to the weighing cradle. The frequency of the string is measured and the value of the applied load is calculated therefrom by an electronic calculating circuit. In order to overcome a problem of frequency deviation caused by variation in the spring constants of both cantilever members due to variation in the surrounding temperature, the inventive device includes a temperature sensor and arithmetic circuitry for applying compensation for the error due to the temperature change to the calculation of the applied force.

17 Claims, 3 Drawing Sheets

FORCE MEASURING DEVICE

This invention relates to a force measuring device of the type utilizing such a principle that the inherent vibration frequency of a stretched string is changed by changing a load applied thereto to change its tension.

BACKGROUND OF INVENTION

This type of force measuring device is disclosed, for example, in the British patent No. 2,133,880. In this device, a metal string is stretched between free ends of a pair of parallel cantilever members and a force to be measured is applied to the free end of one of these members. The tension of the string, which is functionally related to the magnitude of the applied force, also functionally relates to the inherent vibration frequency of the string. Therefore, if the vibration frequency is measured, the applied force can be calculated therefrom.

The tension of the metal string is also controlled by the spring constants of the cantilever members and the spring constants are generally influenced by the surrounding temperature. The string is provided with an initial tension by the repulsion of the slightly deflected cantilever members and this initial tension determines the zero reading of the device. Therefore, a change of the member temperature may result in an undesirable zero-point shift which in turn results in a measurement error.

SUMMARY OF INVENTION

Accordingly, an object of this invention is to provide an improved force measuring device having means for removing error caused by member temperature variation.

In accordance with this invention, there is provided a force measuring device comprising main and auxiliary elastic cantilever members, a metal string stretched between the free ends of both members and means for measuring the vibration frequency of the string and calculating the magnitude of a force applied to the main elastic member, as in the above-cited prior art device. As a feature of this invention, the device further comprises a temperature sensor disposed on at least one of the elastic members and means for calculating a compensatory value based upon the output of the sensor and automatically correct the measured for therewith.

Other objects and features will be readily understood from the following description about a preferred embodiment with reference to the accompanying drawings.

DESCRIPTION OF PREFERRED EMBODIMENT

Figure 1:
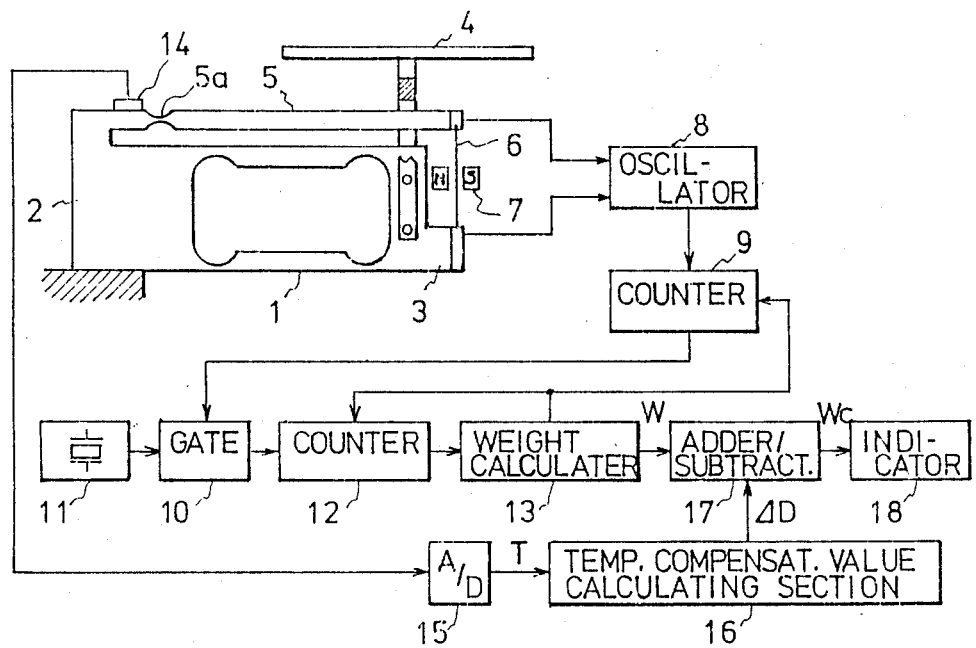
FIG. 1 is a block diagram representing an embodiment of the device according to this invention.

Referring to FIG. 1, a main elastic member 1 having a well-known parallerogramic shape is fixed horizontally to a base at one end 2 thereof and a weighing cradle 4 is attached to the other free end 3. An auxiliary elastic member 5 having a flexure 5a extends from the fixed end 2 of the main elastic member 1 so as to be parallel and spaced above the latter. A metal string 6 is stretched between the free ends of both elastic members 1 and 5 and disposed in a magnetic field of a pair of magnetic poles 7. The string 6 is connected as a part of an oscillator 8 which produces an oscillatory signal at a frequency corresponding to the inherent vibration frequency of the string 6. The detailed arrangement of the oscillator 8 will not be described further since it is described in the above-cited British patent.

The output of oscillator 8 is applied to a counter 9 which serves to count oscillation cycles of the incoming signal and open a gate 10 for a time corresponding to a predetermined number of cycles. A clock pulse generator 11 produces a clock pulse train at a frequency higher than the oscillator frequency which passes the gate 10 while it is open. The clock pulses passing the gate 10 is counted by another counter 12. Accordingly, the count of counter 12 is accurately proportional to the vibration frequency of the string 6 which functionally relates to a load applied to the cradle 4. A weight calculating unit 13 calculates the magnitude W of the applied load from the input count and the abovementioned mathematical relationship.

As a feature of this invention, the weigher further includes means for converting the measured value W into a compensated value Wc which corresponds to a measured value at a predetermined reference temperature, as follows. The reference temperature is selected, for example, as 20° C.

A temperature sensor 14 such as a thermistor is attached to the auxiliary elastic member 5 in the vicinity of the flexure 5a and temperature information or data T from the sensor 14 is applied through an analog-to-digital (A/D) convertor 15 to a temperature compensatory value calculating section 16. The section 16 is operable to calculate a deviation of the measured value W from the corrected value Wc as a difference of the zero-point deviation D at a current temperature from that at the reference temperature. This value ΔD is subtracted from the measured value W in an adder/subtracter 17 which provides the corrected weight Wc to an indicator 18 for indication.

Figure 2:
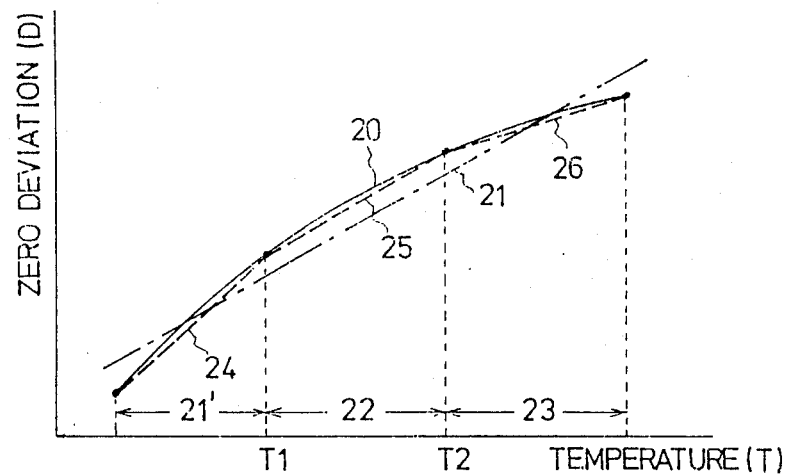
FIG. 2 is a diagram representing zero-point shift due to temperature variation in the device of FIG. 1.

The temperature data T from the sensor 14 is not always linear to the real temperature and, accordingly, the zero-point deviation D is generally non-linear with to the temperature data T. This is especially the case when a thermistor is used as the temperature sensor 14. In FIG. 2, a curve 20 shows an example of such a non-linear D/T plot. If the curve 20 is representative of a quadratic equation:

$$D = aT^2 + bT + c \qquad (1)$$

the zero-point deviation $D_0$ at the reference temperature $T_0$ is given by the following equation.

$$D_0 = aT_0^2 + bT_0 + c \qquad (2)$$

Therefore, $$\Delta D = D - D_0 = aT^2 + bT - k \qquad (3)$$

where $k = aT_0^2 + bT_0 \qquad (4)$

The value k is a constant since a and b are constants and $T_0$ is also a constant determined by the attached sensor 14. The calculating section 16 includes a read-only memory (ROM) (not shown) for storing the equation (3) together with these constants and calculates the compensatory value ΔD from the current temperature data T based upon this equation.

When the D/T plot is representative of a higher order of equation, a similar calculation may be effected using the corresponding equation.

If the D/T plot can be approximated by a straight line 21 as shown in FIG. 2, ΔD can be calculated by a simple equation as follows.

$$\Delta D = K(T - T_0) \tag{5}$$

where K is a constant. Such compensatory calculation as described above may be executed with a program as shown in FIG. 3.

Figure 3:
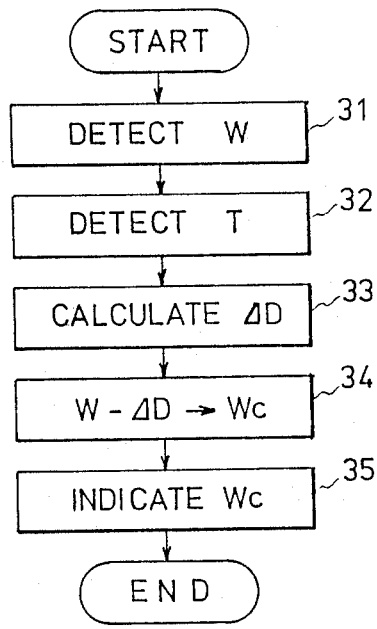
FIGS. 3 and 4 are flow charts representing an example of a calculating operation of the device of FIG. 1.

Referring to FIG. 3, the load W applied to the cradle 4 is calculated by the weight calculating unit 13 in step 31 and the temperature data T is received from the A/D convertor 15 in step 32. Then, the compensatory value ΔD is calculated in the above-described manner in the calculating section 16 in step 33 and subtracted from the calculated load W by the adder/subtracter 17 in step 34. The resultant corrected load Wc is indicated by the indicator 18 in step 35.

Figure 4:
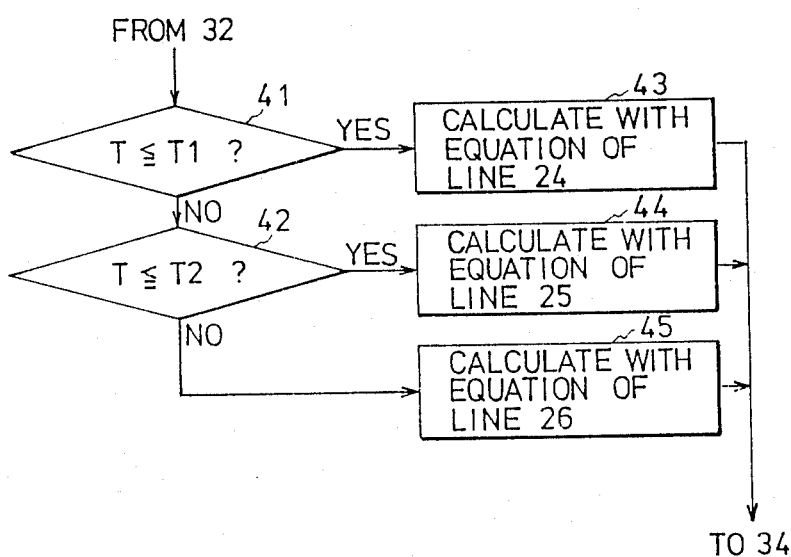

When the D/T plot can neither be represented by a simple equation nor be approximated by a single straight line such as line 21 of FIG. 2, it may be approximated by a series of relatively short lines or segments. An example of this is shown in FIG. 2 where lines 24, 25 and 26 are connected at temperature data points T1 and T2. In this case, the compensatory value calculation in step 33 (FIG. 3) may be executed with a program shown in FIG. 4. Referring to FIG. 4, the current temperature data T is compared with T1 and T2 in steps 41 and 42, respectively, to select one of three temperature regions 21, 22 and 23 which is to be used for calculation, the calculation being executed one of the corresponding steps 43, 44 and 45.

Such approximation and calculation may be omitted by experimentally measuring the compensatory values ΔD for various temperature data points T and storing these values in a read-only memory (ROM) as correlation table. If such table is provided in the form of a matrix of T and W, it is possible to compensate for all errors due to temperature change, inclusive of the abovementioned zero-point shift.

Figure 5:
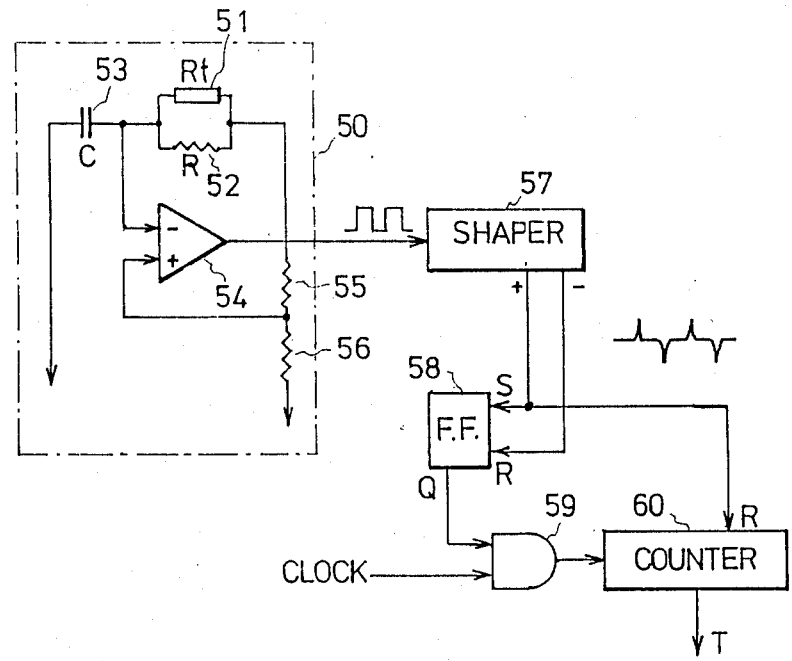
FIGS. 5 and 6 are schematic circuit diagrams representing examples of the analog-to-digital (A/D) convertor in the device of FIG. 1.
Figure 6:
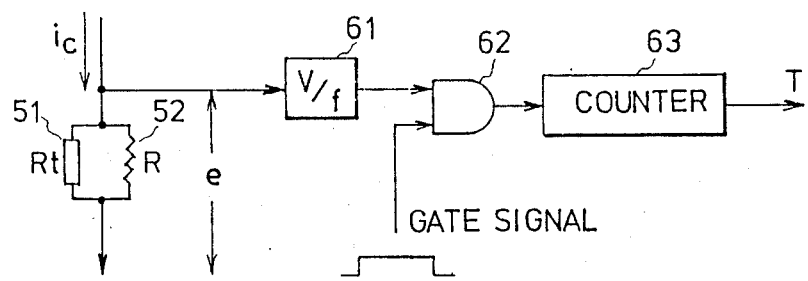

Although the A/D convertor 15 may be composed of a commercially available integrated circuit, it is also possible to use such circuits as shown in FIGS. 5 and 6.

In FIG. 5, an oscillator/amplifier 50 is composed of a parallel circuit of a thermistor 51 and a compensation resistor 52, and a capacitor 53 conneced in series therewith, together with an operation amplifier 54 and voltage dividing resistors 55 and 56. The oscillator/amplifier 50 produces a square wave oscillatory signal at a period t proportional to the temperature Tt of the thermistor 14 as given by the following equation.

$$Tt = K_1 t = K_2 (R \cdot Rt)/(R + Rt) C$$

where $K_1$ and $K_2$ are constants and R, Rt and C are parameters of the components as shown in FIG. 5.

The square wave signal produced from the oscillator/amplifier 50 is converted into a bidirectional spike pulse train as shown by a suitable shaping circuit 57 and the resultant positive and negative pulses are applied respectively to set and reset inputs of a flip-flop circuit 58. The Q-output of the flip-flop 58 is coupled to one input of an AND gate 59 another input of which is coupled to a clock generator (not shown). Accordingly, the clock pulses pass the AND gate 59 and are counted by a counter 60, so that the count of counter 60 is proportional to the temperature Tt. Thus, this count is supplied to the compensatory value calculating section 16 as the temperature data T.

The circuit of FIG. 6 includes a parallel connection of thermistor 51 and compensation resistor 52. When a constant current $i_c$ is applied to this parallel connection, a voltage drop e appears across it in proportion to its resistance, that is, RtR/(Rt+R). This voltage e is converted by a voltage-to-frequency convertor (V/f) 61 into an alternating wave having a frequency proportional to the input voltage e. This frequency signal is applied to a counter 63 through an AND gate 62 which is opened by a gate signal having a predetermined duration. Accordingly, the count of couter 63 is also proportional to the temperature Tt and can be used as the temperature data T.

We claim:

1. A force measuring device comprising:
   main and auxiliary elastic cantilever members spaced parallel one from the other, said main member being adapted to receive a force to be measured at the free end thereof;
   a string stretched between the free ends of said main and auxiliary members;
   means for measuring the vibration frequency of said string and calculating therefrom the magnitude of said force to be measured;
   means for sensing the temperature of at least one of said main and auxiliary members for providing data indicative of the temperature thereof;
   means for calculating from said data a compensatory value corresponding to said temperature; and
   means for correcting said calculated magnitude of force using said compensatory value.

2. A force measuring device, as set forth in claim 1, wherein said calculating means includes memory means for storing a collation table of various temperatures and corresponding compensatory values, and said correcting means is adapted for responding to said temperature data to use said corresponding compensatory value from said collation table for correction.

3. A force measuring device, as set forth in claim 1, wherein said means for measuring and calculating comprises an oscillator connected to said string, a first counter for counting oscillations of said oscillator and a weight calculator adapted to provide a weight signal corresponding to a value in said first counter; wherein said means for sensing comprises a temperature sensor attached to said auxiliary elastic member and an analog-to-digital converter connected to said sensor and adapted to provide as said data a digital signal indicative of the temperature of said auxiliary elastic member; and wherein said means for correcting comprises an adder/subtractor adapted to add/subtract said compensatory value to/from said weight signal.

4. A force measuring device, as set forth in claim 3, wherein said means for measuring and calculating further comprises a gate responsive to said first counter, a clock providing a clock pulse train to said gate, a second counter counting clock pulses gated through said gate by said first counter and wherein said weight calculator is adapted to provide a weight signal indicative of a value in said second counter.

5. A force measuring device, as set forth in claim 1, wherein said calculating means includes memory means for storing a functional relationship between said temperature data and said compensatory value, and arithmetic means for computing said compensatory value from said temperature data in accordance with said functional relationship.

6. A force measuring device, as set forth in claim 5, wherein said functional relationship is an approximate quadratic equation.

7. A force measuring device, as set forth in claim 6, wherein said approximate quadratic equation comprises:

$$\Delta D = aT^2 + bT - k$$

where T is the temperature, $T_0$ is a reference temperature, $\Delta D$ is the deviation correction between the reference temperature $T_0$ and temperature T, a and b are constants and $k = aT_0^2 + bT_0$.

8. A force measuring device, as set forth in claim 5, wherein said functional relationship is at least one approximate linear equation.

9. A force measuring device, as set forth in claim 8, wherein said approximate linear equation comprises:

$$\Delta D = K(T - T_0).$$

where T is the temperature, $T_0$ is a reference temperature, $\Delta D$ is the deviation correction between the reference temperature $T_0$ and temperature T and K is a constant.

10. A method of measuring a force by a force measuring device including at least one elastic member for receiving said force, comprising the steps of obtaining and storing a functional relationship between the temperature of said elastic member and a corresponding compensatory value for the measured force, attaching a temperature sensor to said elastic member to obtain data indicative of the temperature thereof, calculating from said data a compensatory value corresponding to said temperature in accordance with said stored functional relationship, and correcting the measured force using said compensatory value.

11. A method, as set forth in claim 10, wherein said functional relationship is stored as a quadratic equation.

12. A method as set forth in claim 11, wherein said quadratic equation comprises:

$$\Delta D = aT^2 + bT - k$$

where T is the temperature, $T_0$ is a reference temperature, $\Delta D$ is the deviation correction between the reference temperature $T_0$ and temperature T, a and b are constants and $k = aT_0^2 + bT_0$.

13. A method, as set forth in claim 10, wherein said functional relationship is stored as at least one linear equation.

14. A method, as set forth in claim 13, wherein said linear equation comprises:

$$\Delta D = K(T - T_0)$$

where T is the temperature, $T_0$ is a reference temperature, $\Delta D$ is the deviation correction between the reference temperature $T_0$ and temperature T and K is a constant.

15. A method, as set forth in claim 10, wherein said step of obtaining and storing comprises oscillating a string stretched between main and auxiliary elastic members spaced parallel one from the other and adapted to receive a force to be measured at the free end thereof, counting the oscillations, calculating a weight signal corresponding to a value in said count, and converting said data into a digital signal indicative of the temperature of said auxiliary elastic member; and wherein said correcting step comprises adding/subtracting said compensatory value to/from said weight signal.

16. A method, as set forth in claim 15, wherein said step of obtaining and storing further comprises the steps of gating a clock pulse train in response to said count, counting the gate clock pulse train and wherein said weight signal is indicative of a value in the gated pulse count.

17. A method of measuring a force by a force measuring device having at least one elastic member for receiving said force, comprising the steps of storing a collation table of various temperatures of said elastic member and corresponding compensatory values for the measured force, attaching a temperature sensor to said elastic member to obtain data indicative of the temperature thereof, reading a compensatory value corresponding to said temperature from said collation table, and correcting the measured force using said compensatory value.

* * * * *